(12) United States Patent
Yang et al.

(10) Patent No.: US 6,442,797 B1
(45) Date of Patent: Sep. 3, 2002

(54) FLEXIBLE TRANSMISSION DEVICE

(75) Inventors: Cheng-Fan Yang, Tainan Hsien; Chuan-Ming Yeh, Chia-I; Mao-Shen Chen, Tainan, all of (TW)

(73) Assignee: Link Treasure Limited, Tortola (VG)

( * ) Notice: Subject to any disclaimer, the term of this patent is extended or adjusted under 35 U.S.C. 154(b) by 51 days.

(21) Appl. No.: 09/706,836

(22) Filed: Nov. 7, 2000

(51) Int. Cl.[7] ............................................. B65D 25/28
(52) U.S. Cl. ................................. 16/113.1; 280/47.371
(58) Field of Search .......................... 16/113.1, 405, 16/429; 190/39, 115, 117, 118; 280/655, 655.1, 47.315, 47.371, 47.41; 297/20; 74/551.3, 551.7

(56) References Cited

U.S. PATENT DOCUMENTS

| | | | | |
|---|---|---|---|---|
| 4,354,689 A | * | 10/1982 | Perego | 280/47.371 |
| 4,577,877 A | * | 3/1986 | Kassai | 280/47.371 |
| 4,587,864 A | * | 5/1986 | Kassai | 74/551.3 |
| 5,511,441 A | * | 4/1996 | Arai | 74/551.3 |
| 5,535,483 A | * | 7/1996 | Cabagnero | 16/429 |
| 5,622,377 A |   | 4/1997 | Shamie |  |
| 5,765,885 A |   | 6/1998 | Netto |  |
| 5,769,447 A | * | 6/1998 | Huang | 280/650 |
| 5,882,030 A |   | 3/1999 | Haut |  |
| 6,155,740 A | * | 12/2000 | Hartenstine | 403/102 |
| 6,339,862 B1 | * | 1/2002 | Cheng | 16/113.1 |
| 6,182,981 B1 | * | 2/2002 | Kuo | 280/47.371 |

* cited by examiner

*Primary Examiner*—Anthony Knight
*Assistant Examiner*—Doug Hutton
(74) *Attorney, Agent, or Firm*—Birch, Stewart, Kolasch & Birch, LLP

(57) ABSTRACT

A flexible transmission device utilizes two flexible cables or ropes to pass through a narrow passage and connect two operating elements. An extendable mechanism is an intermediate of the two flexible elements. The extendable mechanism includes two tubes co-axially linked to each other. The two flexible elements overlap in the extendable mechanism in a free moving condition, which allows the relative distance between the two operating elements changing. When a flexible element is pulled from an operating member, a slider connected between the two flexible elements will be biased to fasten the two flexible elements so that the drag force can be transmitted to the second operating member.

9 Claims, 5 Drawing Sheets

FLEXIBLE TRANSMISSION DEVICE

BACKGROUND OF THE INVENTION

1. Field of Invention

The present invention generally relates to a flexible transmission device, and more particularly relates to a flexible transmission device in which a cable or rope is used to pass through a narrow passage and connect two operating elements, so that a drag force can always be transmitted even when the relative distance between the two operating elements being changed.

2. Related Art

Using a flexible element, such as a cable or rope, to transmit a drag force is a well-known art. For example, a brake for a bicycle or a motorcycle generally uses a steel cable to transmit an operation force from a brake lever. Many foldable baby strollers, such as disclosed in U.S. Pat. Nos. 5,765,885; 5,769,447; 5,882,030; 5,622,377 and so on, use a similar flexible transmission device for releasing a latch mechanism for the folding-up purpose. The flexible device includes a steel cable for remotely pulling a latch mechanism or the like and releasing a foldable portion of the stroller.

In the aforesaid prior arts, the steel cable is loosely enclosed in a flexible tube, such as a plastic tube or a scrolled-wire tube. The flexible tube is fixed at both ends to the frame structure for guiding the steel cable moving therein responding to the operation. The two ends of the cable link respectively to an operation lever and an actuating member, such as a brake or latch. Since the elements on both ends of the cable are generally adjustable with relative positions, for instance, the brake lever of a bicycle will change its relative position or distance to the brake along with the height adjustment of the handle. Likewise, the control lever of a stroller will change its relative position or distance to the latch mechanism along with the folding operation of the frame. In the prior arts, the change of relative distance or position makes the flexible tube change its shape, such as the curve thereof. The different curve bending won't influence the function, but it requires a certain length and space for the bending. Therefore, in the prior arts, the flexible cable and tube has to be long enough and loosely fixed outside the frame.

The aforesaid flexible cable and tube fixed outside a frame will not suitable for some foldable devices, especially when a compact structure is an important objective. For example, a foldable stroller is intended to be smaller when being folded. The length of the tube has to be shortened, which may constrain the operation of cable when being bent too much. Or, the bending causes inconvenience and bad looks of folding.

If we try to enclose the flexible cable and tube in the frame, such as the tube of the bicycle or stroller, then the limited space of the tube will constrain the bending of the cable, and make the solution unworkable.

SUMMARY OF THE INVENTION

It is therefore an object of the present invention to provide a flexible transmission device, which allows the change of length in the flexible elements.

Another object of the present invention is to provide a flexible transmission device, which can be enclosed in a limited space, such as a tube, and allows the change of length in the flexible elements.

The present invention uses flexible elements to link two operating members. When the relative distance between the two operating members changes, the flexible elements are still workable for transmitting a drag force.

To achieve the aforesaid objects, a flexible transmission device according to the present invention includes two flexible elements each having one end linking to an extendable mechanism, and each other end linking to a remote operating member respectively. The extendable mechanism includes a first tube and a second tube coaxially linking with each other so that the second tube is movable inside the first tube for changing the relative position or length of the two tubes that connect to the aforesaid two flexible elements respectively. In other words, when the two operating members linking at ends of the flexible elements change their relative positions, the extendable mechanism will change its length accordingly. The two flexible elements are defined as a first and a second flexible element. The first flexible element fixedly mounted along the axial direction of the extendable mechanism, with one end fixed to a first operating member, and the other end fixed to a slider movable along the second flexible element. The slider will be temporarily tilted to fix on the second flexible element when being pulled by the first flexible element so as to transmit the drag force. The second flexible element is fixed inside the extendable mechanism with one end fixed to the movable second tube, and the other end to the second operating member. The second flexible element can be moved in the axial direction of the extendable mechanism along with the axial length change of the extendable mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The present invention uses flexible elements, such as cables, ropes or the like, to link two operating members. When the relative distance between the two operating members changes, the flexible elements are still workable for transmitting a drag force.

Figure 1:
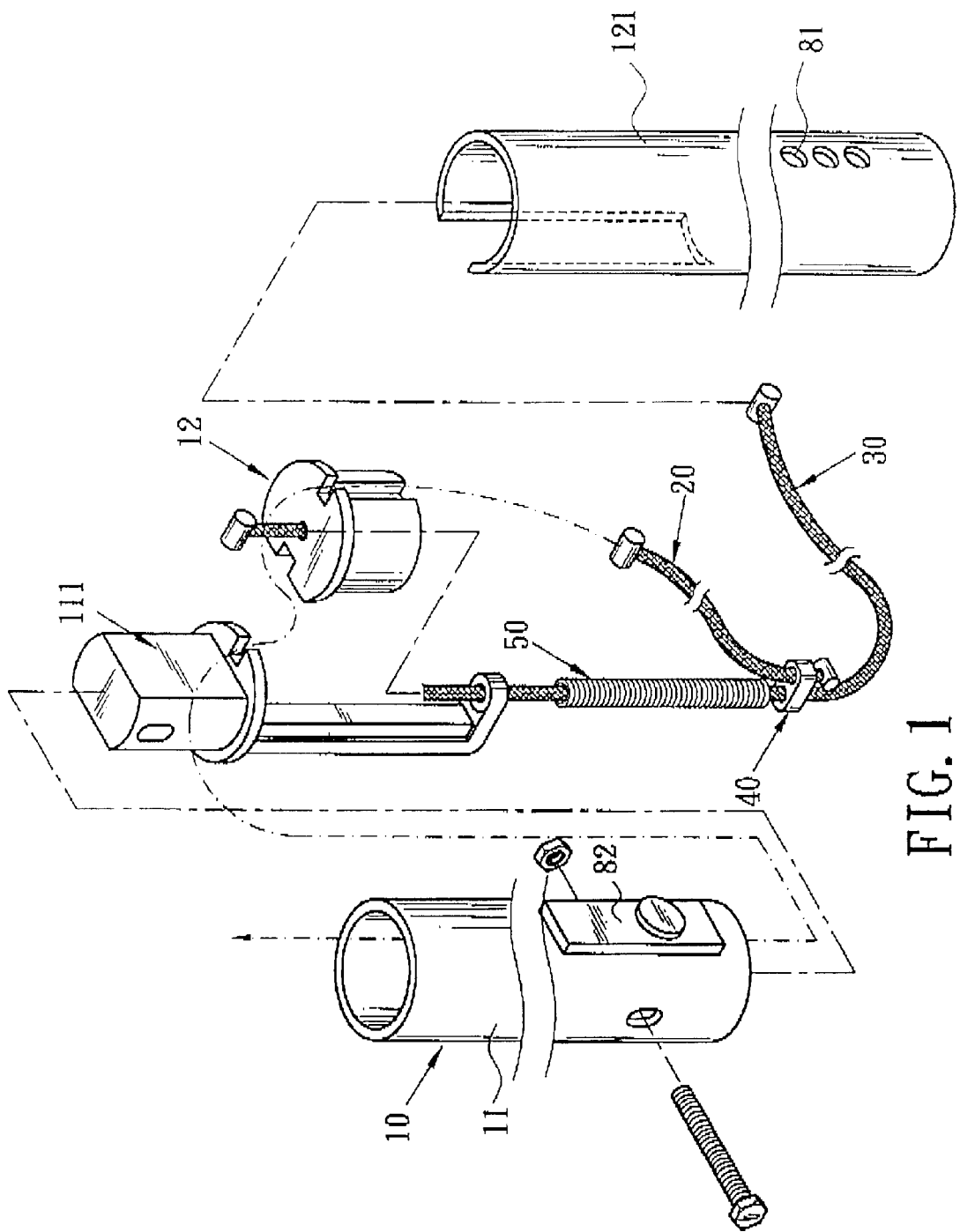
FIG. 1 is an exploded view of a flexible transmission device according to the present invention.
Figure 2:
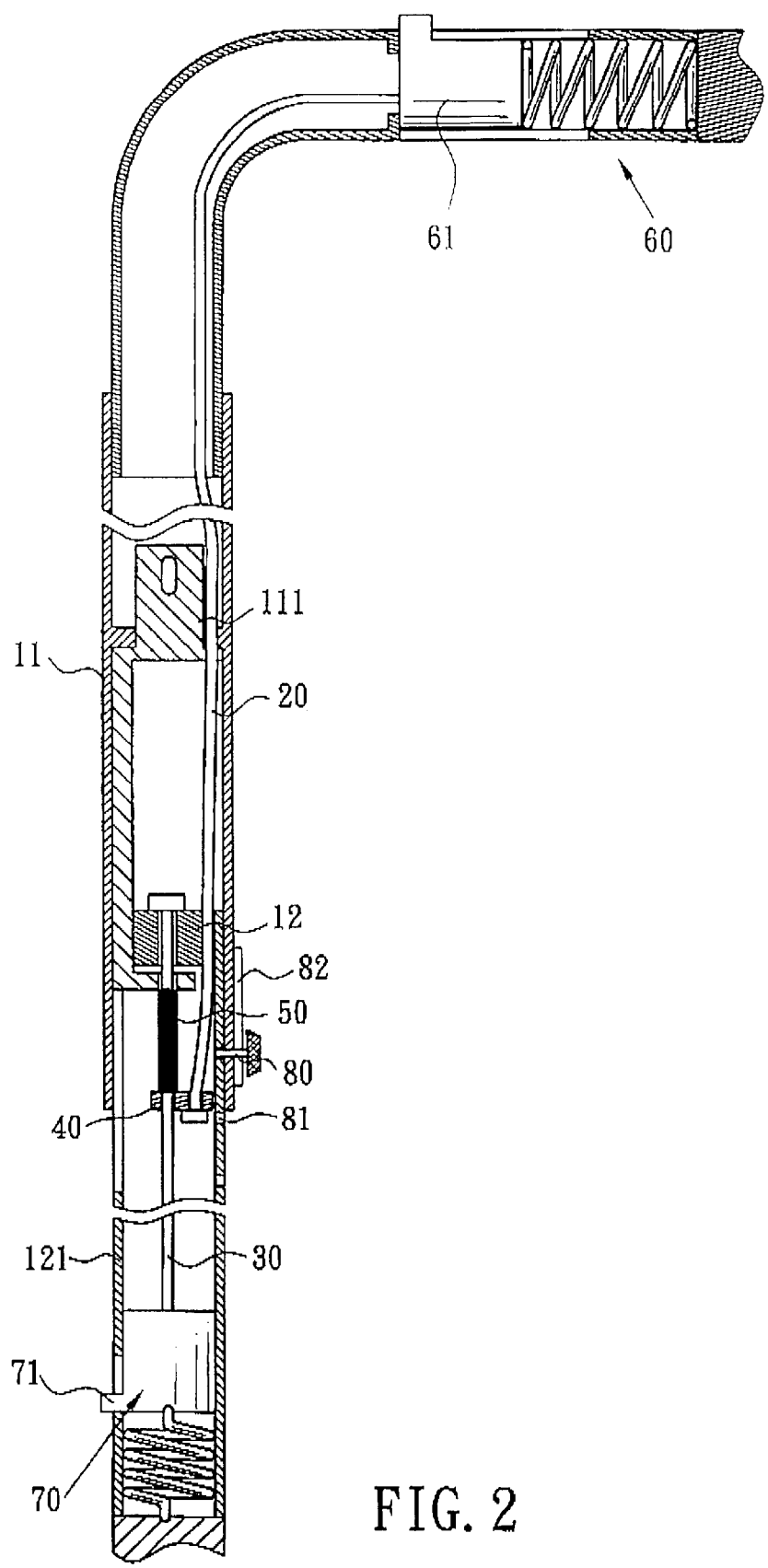
FIG. 2 is a sectional view of the present invention showing the components in a normal state.

As shown in FIG. 1 and FIG. 2, a flexible transmission device according to the present invention mainly includes an extendable mechanism 10, a first and a second flexible element 20, 30 each having one end linking to the extendable mechanism 10, and the other end linking to the remote operating members 60, 70 respectively. The extendable mechanism 10 includes a first tube 11 and a second tube 12 coaxially linking with each other so that the second tube 12 is movable inside the first tube 11 for changing the relative position or length of the two tubes 11, 12, that connect to the aforesaid two flexible elements 20, 30 respectively. In other words, when the two operating members 60, 70 linking at ends of the flexible elements 20, 30 change their relative positions, the extendable mechanism 10 will change its length accordingly.

There are means for adjusting the length of the extendable mechanism 10, i.e., the relative position of the first tube 11 and the second tube 12. The adjusting means include a plurality of positioning holes 81 formed on the second tube 12; a movable pin 80 radially passing through a hole formed on the first tube 11 and being selectively fixed into one positioning hole 81 of the second tube 12; and a retaining element 82 for normally keeping the movable pin 80 in any a positioning hole 81.

The first and second flexible elements 20, 30 are steel cables, ropes or other similar elements. The first flexible element 20 is fixed with one end to a first operating member 60, and the other end to a slider 40. The slider 40 is sleeved on and movable along the second flexible element 30. One end of the second flexible element 30 is fixed to the second operating member 70. The slider 40 will be temporarily tilted to grasp the second flexible element 30 when being pulled by the first flexible element 20. So that, the drag force of the first operating member 60 can be transmitted, via the first flexible element 20, the slider 40 and the second flexible element 30 to the second operating member 70.

The first flexible element 20 is movable inside the first tube 11 of the extendable mechanism 10. The second flexible element 30 is fixed inside the extendable mechanism 10 with one end fixed to the movable second tube 12, and the other end to the second operating member 70. When the drag force is applying from the first operating member 60, the first flexible element 20 and the second flexible element 30 will seize together for transmitting the force to the second operating element 70.

Figure 5:
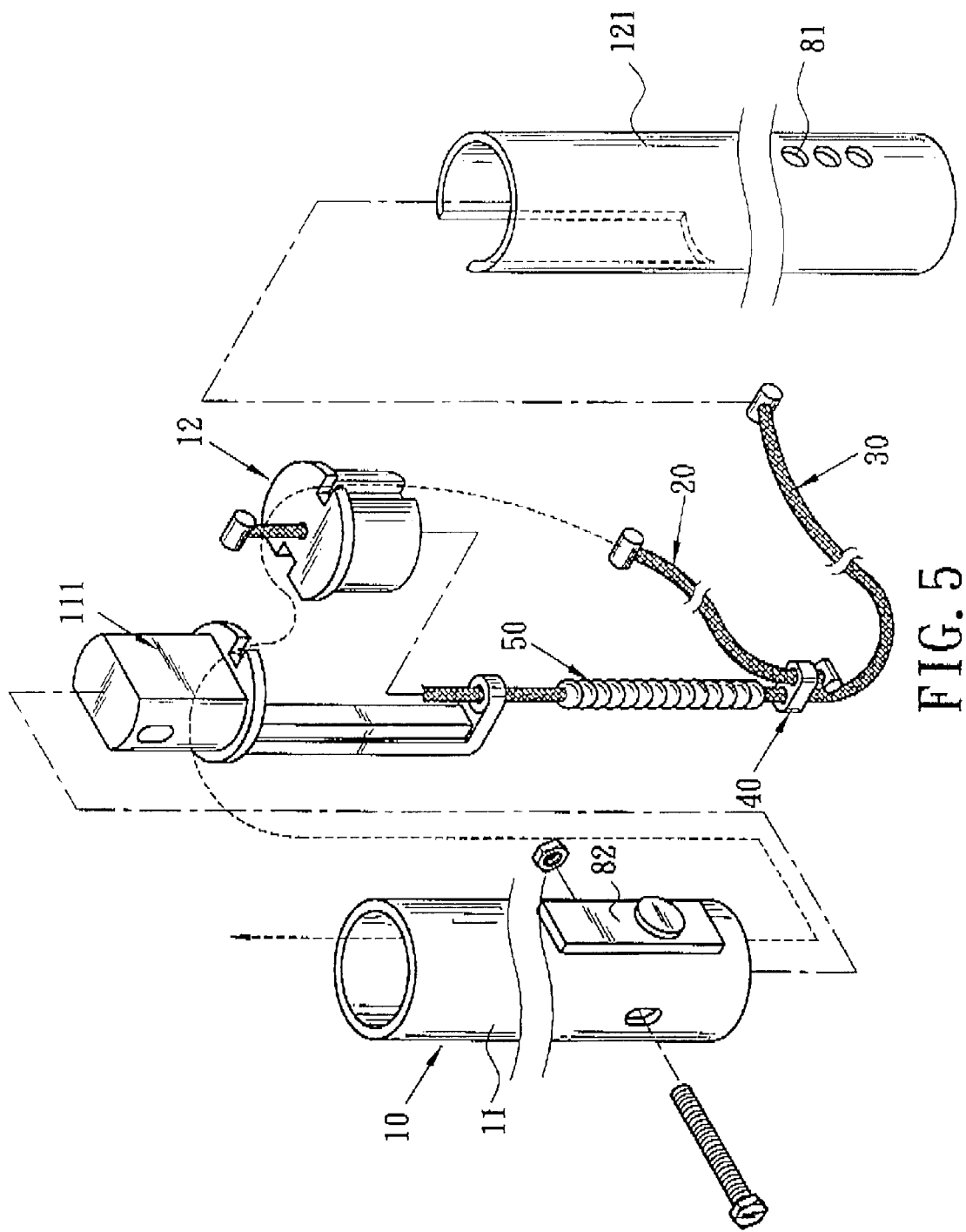
FIG. 5 is an exploded view of another embodiment of a flexible transmission device according to the present invention showing another kind of a retaining element.

In a normal condition, the second flexible element 30 and the slider 40 can be relatively moved since there is a suitable gap between the second flexible element 30 and a through hole of the slider 40. A retaining element 50 mounting on the second flexible element 30 is used to press the slider 40 and always straighten the overlapped length of the two flexible elements 20, 30 for being ready to transmit drag force. The retaining element 50 normally supports the slider 40 in an idle position free from firm contact with the flexible element 30 by maintaining a circular gap between the two. The retaining element 50 is a resilient element, such as a spring as shown in FIG. 1, or a plurality of resilient pearls as shown in FIG. 5. One end of the retaining element 50 is fixed to a portion, for example on one end of a core 111, of the first tube 11, which is relatively fixed to the first operating member 60. The other end of the retaining element 50 is fixed to the slider 40 to normally support it in an straightened position as shown in FIG. 2. One end of the second flexible element 30 is fixed to and pulled by the second operating member 70. The other end of the second flexible element 30 is mounted through a sleeve 121, which is fixed to one end of the second tube 12. So that, the second flexible element 30 is straightly extended and can be moved in the axial direction of the extendable mechanism 10 along with the axial length change of the extendable mechanism 10.

Figure 3:
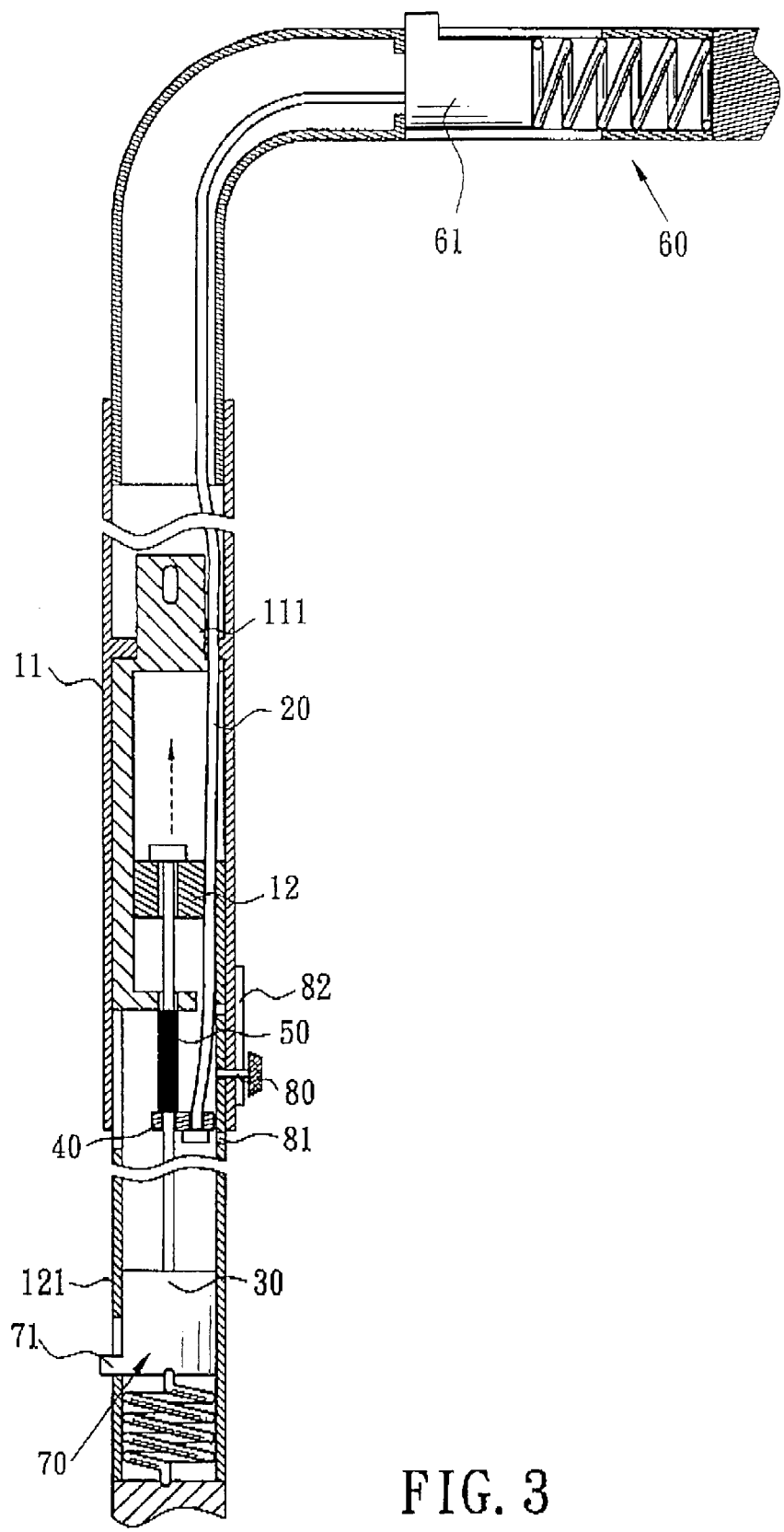
FIG. 3 is a sectional view of the present invention showing the components in another normal state where the length of the extendable mechanism is shortened.

The slider 40 is sleeved on the second flexible element 30. The slider 40 can be freely moved on the second flexible element 30 so as to adjust itself and maintain the straight extending conditions of the first flexible elements 20 when the first tube 11 and the second tube 12 of the extendable mechanism 10 are relatively changed of their positions. As shown in FIG. 3, when the user releasing the movable pin 80 and moving the second tube 12 inwards the first tube 11 to shorten the length of the extendable mechanism 10, the retaining element 50 will support the slider 40 moving along the second flexible element 30 so as to maintain the first flexible element 20 in the straightened position.

In the same way, when the user releasing the movable pin 80 and moving the second tube 12 outwards the first tube 11 to lengthen the length of the extendable mechanism 10, the retaining element 50 will also support the slider 40 moving along the second flexible element 30 so as to maintain the first flexible elements 20 in the straightened position.

Figure 4:
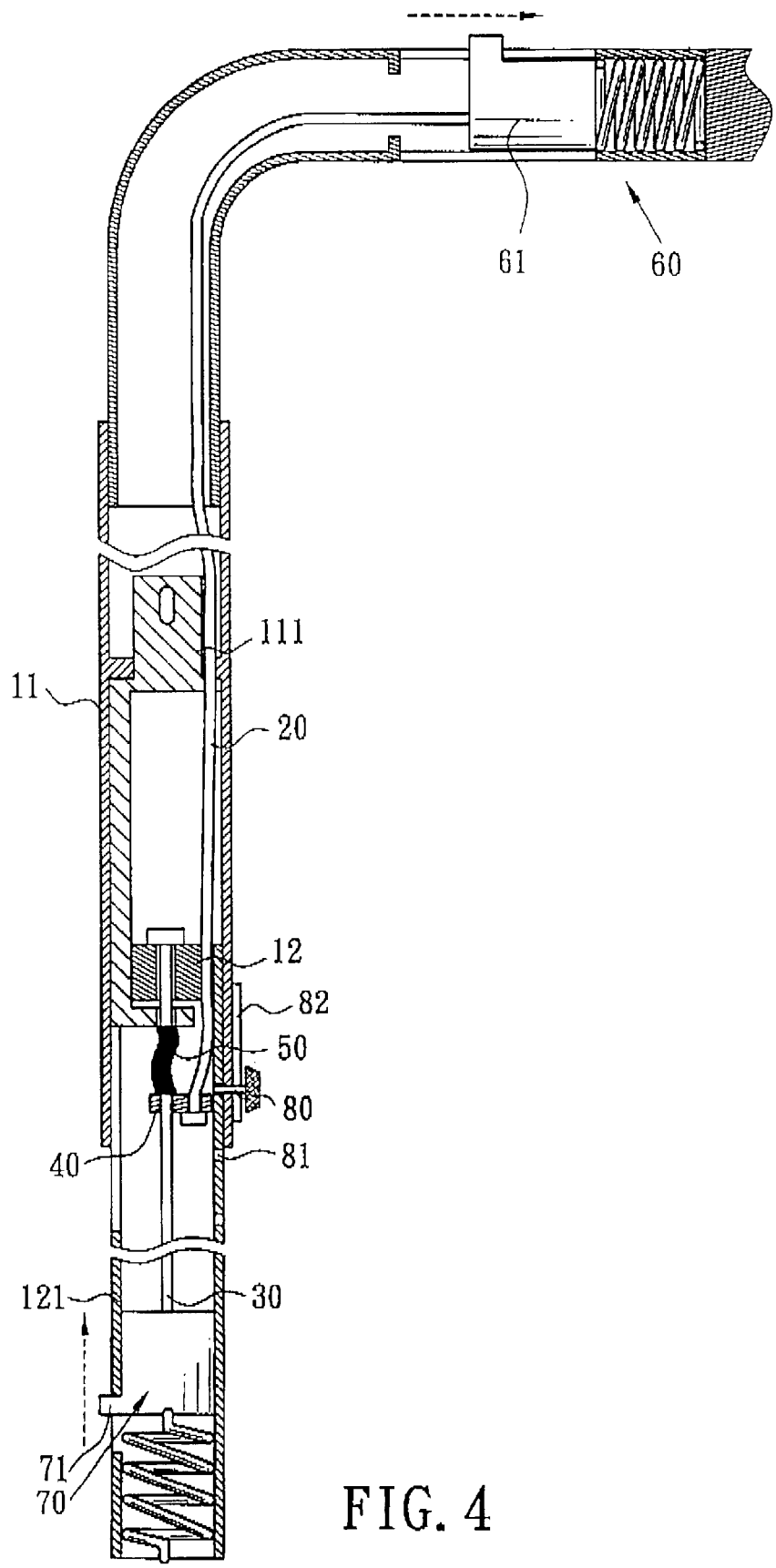
FIG. 4 is a sectional view of the present invention showing the components in a working state where the flexible elements are seized and moved to transmit drag force.

As shown in FIG. 4, when the user operating the first operating member 60, for example, moving a trigger 61, to apply a drag force to the slider 40 through the first flexible element 20, the slider 40 will be biased to catch the second flexible element 30 and pull it moving. In this moment, the retaining element 50 is pressed and bent since the drag force of the first flexible element 20 generating a moment to the slider 40, which is caused by the different centering lines of the two flexible elements 20, 30 passing through the slider 40. When the slider 40 is biased on the second flexible element 30, the sharp rims of the hole of the slider 40 where the second flexible element 30 passing through will seize on the flexible element 30 and firmly grasp it. Therefore, the first flexible element 20 will pull the second flexible element 30 and the second operating member 70 to achieve a certain function, such as releasing a latch 71 as shown.

The aforesaid embodiments of flexible transmission device according to the present invention can be applied to a device having a foldable frame or an adjustable frame. For example, the first and second tubes 11, 12 of the extendable mechanism 10 can be the handle bar and the main frame of a stroller. In a bicycle, the first and second tubes 11, 12 can be the brake handle and the main frame of the bicycle where the two elements are relatively adjustable with their positions.

In conclusion, the present invention uses flexible elements, such as cables, ropes or the like, to link two operating members. When the relative distance between the two operating members changes, the flexible elements are still workable for transmitting a drag force. The flexible transmission device can be applied to a device having a foldable frame or an adjustable frame, for example, a handle bar and a foldable frame of a stroller, or a brake lever and the frame of a bicycle, where a drag force can still be transmitted when the two elements are relatively adjustable with their positions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flexible transmission device, capable of being applied in a narrow passage to transmit a drag force from a first operating member to a second operating member, comprising:

an extendable mechanism, capable of changing axial length thereof, having two ends connecting to said first operating member and said second operating member respectively;

a second flexible element, having one end axially connected to said extendable mechanism and moved along therewith, and another end connected to and pulled by said second operating member so as to be straightened;

a slider, formed with a through hole to sleeve said second flexible element so as to be freely movable thereon when being supported in a free position, and capable of catching said second flexible element to pull the same when being biased to a grasping position;

a first flexible element, mounted axially to said extendable mechanism, having one end fixed to said first operating member, and another end connected to said slider at an axis different from said through hole so as to bias the slider when being pulled; and a retaining element, sleeved on one end of said second flexible element, having one end connected to a portion of said extendable mechanism that is relatively fixed to said first operating member, and another end to pressively support said slider in said free position.

2. A flexible transmission device as recited in claim 1 wherein the extendable mechanism is composed of a first tube and a second tube, said second tube co-axially links inside said first tube; said first and second tubes remotely connect to the first and second operating members respectively and are capable of changing the relative position according to the relative change of said first and second operating members.

3. A flexible transmission device as recited in claim 2 further comprises control means for changing the relative position of the first and second tubes.

4. A flexible transmission device as recited in claim 3 wherein the control means for changing the relative position of the first and second tubes includes:

a plurality of positioning holes formed on said second tube;

a movable pin, radially passing through a hole formed on said first tube and being selectively fixed into any one positioning hole of said second tube; and a retaining element for normally keeping said movable pin in any of said positioning holes.

5. A flexible transmission device as recited in claim 1 wherein the first and second flexible elements are selectable from a group of steel cables and ropes.

6. A flexible transmission device as recited in claim 2 wherein one end of the second tube is fixed to the second operating member; another end of said second tube is fixed with a sleeve for fixing one end of the second flexible element so as to move the second flexible element along with the movement of the second tube.

7. A flexible transmission device as recited in claim 1 wherein the retaining element includes a plurality of resilient pearls sleeved on the second flexible element.

8. A flexible transmission device as recited in claim 1 wherein the retaining element is a spring.

9. A flexible transmission device as recited in claim 2 wherein one end of the first tube is fixed with a core for fixing one end of the retaining element, which is in a position relatively fixed to the first operating member.

* * * * *